United States Patent
Bae et al.

(10) Patent No.: US 10,186,709 B2
(45) Date of Patent: Jan. 22, 2019

(54) WATER-SOLUBLE POLYAMIC ACID, METHOD OF PREPARING THE SAME, BINDER COMPOSITION FOR LITHIUM BATTERY INCLUDING THE SAME, AND LITHIUM BATTERY MANUFACTURED USING THE BINDER COMPOSITION

(71) Applicant: SAMSUNG ELECTRONICS CO., LTD., Suwon-si, Gyeonggi-do (KR)

(72) Inventors: Woojin Bae, Yongin-si (KR); Seunguk Kwon, Suwon-si (KR); Jeeeun Yang, Uiwang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 145 days.

(21) Appl. No.: 15/356,932

(22) Filed: Nov. 21, 2016

(65) Prior Publication Data
US 2017/0155151 A1    Jun. 1, 2017

(30) Foreign Application Priority Data

Nov. 26, 2015    (KR) .................... 10-2015-0166417

(51) Int. Cl.
| | | |
|---|---|---|
| *C08G 69/48* | (2006.01) | |
| *H01M 4/62* | (2006.01) | |
| *H01M 4/36* | (2006.01) | |
| *H01M 4/38* | (2006.01) | |
| *H01M 4/04* | (2006.01) | |
| *H01M 4/139* | (2010.01) | |
| *C08G 73/10* | (2006.01) | |
| *H01M 4/587* | (2010.01) | |

(52) U.S. Cl.
CPC .......... *H01M 4/622* (2013.01); *C08G 73/105* (2013.01); *C08G 73/1071* (2013.01); *H01M 4/0471* (2013.01); *H01M 4/139* (2013.01); *H01M 4/362* (2013.01); *H01M 4/386* (2013.01); *H01M 4/587* (2013.01)

(58) Field of Classification Search
CPC ............................ C08G 69/48; C08G 73/10
See application file for complete search history.

(56) References Cited

U.S. PATENT DOCUMENTS

| | | | | |
|---|---|---|---|---|
| 4,480,088 A | | 10/1984 | Pike | |
| 4,910,050 A | * | 3/1990 | Oldham | ................ B64G 1/52 244/1 A |

(Continued)

FOREIGN PATENT DOCUMENTS

| | | |
|---|---|---|
| JP | 1973-016331 A | 12/1966 |
| JP | 1994-049360 A | 2/1994 |

(Continued)

OTHER PUBLICATIONS

Lee, Journal of Membrane Science 196 (2002) 267-277 (Year: 2002).*

(Continued)

*Primary Examiner* — Robert C Boyle
(74) *Attorney, Agent, or Firm* — Cantor Colburn LLP

(57) ABSTRACT

A water-soluble partially lithiated polyamic acid having an acid equivalent of less than 300 grams per equivalent and a degree of lithium ion substitution of from about 0.2 equivalents to about 1.0 equivalent with respect to carboxylic acid groups, which is a product of a polyamic acid and lithium hydroxide.

11 Claims, 5 Drawing Sheets

(56) References Cited

U.S. PATENT DOCUMENTS

| | | | |
|---|---|---|---|
| 9,200,116 B2 | 12/2015 | Jeong et al. | |
| 2012/0064229 A1* | 3/2012 | Muthu | H01M 4/0404 427/77 |
| 2013/0260223 A1* | 10/2013 | Jeong | C09D 179/08 429/188 |
| 2013/0323587 A1* | 12/2013 | Kose | H01M 4/386 429/211 |

FOREIGN PATENT DOCUMENTS

| | | |
|---|---|---|
| JP | 2012-207196 A | 10/2012 |
| JP | 2013-089437 A | 5/2013 |
| KR | 10-2013-0112324 A | 10/2013 |
| KR | 10-1355288 B1 | 1/2014 |

OTHER PUBLICATIONS

Johnson, BDX-612-509, Technical Communication, Bendix, Kansas City Division, May 1971, p. 1-26 (Year: 1971).*

Jun Yang et al. "A Water-Soluble Polyimide Precursor: Synthesis and Characterization of Poly(amic acid) Salt", Macromolecular Research, vol. 12, No. 3, pp. 263-268 (2004).

* cited by examiner

WATER-SOLUBLE POLYAMIC ACID, METHOD OF PREPARING THE SAME, BINDER COMPOSITION FOR LITHIUM BATTERY INCLUDING THE SAME, AND LITHIUM BATTERY MANUFACTURED USING THE BINDER COMPOSITION

CROSS-REFERENCE TO RELATED APPLICATION

This application claims priority to and the benefit of Korean Patent Application No. 10-2015-0166417, filed on Nov. 26, 2015, in the Korean Intellectual Property Office, the content of which is incorporated herein in its entirety by reference.

BACKGROUND

1. Field

The present disclosure relates to a water-soluble polyamic acid, a method of preparing the same, a binder composition for a lithium battery including the same, and the lithium battery manufactured using the binder composition.

2. Description of the Related Art

Polyvinylidene difluoride (PVDF), styrene-butadiene rubber-carboxymethylcellulose (SBR-CMC), and the like, which are mainly used as a binder in the battery field, exhibit good binding properties and good binding efficiency when used in carbon anode materials. However, when silicon active materials are used as an anode material, it is difficult to use PVDF or SBR-CMC because silicon active materials undergo volumetric expansion and shrinkage during battery charging and discharging, which makes it difficult to maintain mechanical and physical properties and adhesive strength by using PVDF or SBR-CMC.

Currently, lithium polyacrylate (LiPAA) exhibits the best properties in the silicon active materials, but easily breaks and has low toughness. Thus, when LiPAA is bent in a cylindrical form, it becomes broken or cracked, which makes it suitable for use only in coin cells.

Polyimide binders are engineering materials with good physical properties, chemical resistance and thermal resistance. They are regarded as materials capable of withstanding thousands of cycles in batteries, particularly, secondary batteries for automobile vehicles.

However, while such polyimide binders exhibit largely increasing lifespan, lithium ions may be absorbed thereinto, causing an irreversible reaction, which makes it difficult to prevent a decrease in initial efficiency. In addition, polyimides are insoluble in water, and thus methods of dissolving polyimides in a desired solvent by linking various kinds of functional groups to branched polyimide chains are used. However, these methods are not suitable for use in water-soluble polyimides.

With regards to the water-soluble polyimides, a post-treatment process, e.g., imidization of polyamic acid used as a binder, which is a polyimide precursor through heat treatment, is most widely used method as far as manufacturing costs and processes and solubility are concerned. However, when an electrode is manufactured using such method, it is difficult to raise the temperature of an electrode plate up to 160° C. or higher due to oxidation of a copper (Cu) substrate, and thus, a polyimide binder exhibits a low curing rate. If the curing rate is low, carboxylic acid groups of polyamic acid directly bond to lithium ions, and thus an irreversible reaction occurs, which results in decreased initial efficiency. In addition, unstable amide bonds exist, which may adversely affect an extended battery lifespan.

As such, although polyimide binders have high adhesive strength and good mechanical and physical properties, such polyimide binders are not suitable for use in actual industries due to long-term reliability deterioration by unstable bonds occurring due to difficulties in low-temperature curing, a decrease in initial efficiency due to an irreversible reaction of lithium ions, insolubility in water, and the like.

Thus, there remains a need in binders that may prevent a decrease in initial efficiency of a lithium battery.

SUMMARY

Provided are water-soluble polyamic acids that may have a high imidization ratio even in a low-temperature curing process and prevent a decrease in initial efficiency of a lithium battery.

Provided are binder compositions for lithium batteries that include the water-soluble polyamic acids.

Provided are lithium batteries manufactured using the binder compositions.

Provided are methods of preparing the water-soluble polyamic acids.

Provided are methods of manufacturing electrodes for lithium batteries using the binder compositions.

Additional aspects will be set forth in part in the description which follows and, in part, will be apparent from the description, or may be learned by practice of the presented exemplary embodiments.

According to an aspect of an exemplary embodiment, provided is a water-soluble partially lithiated polyamic acid having an acid equivalent of less than 300 grams per equivalent and a degree of lithium ion substitution of from about 0.2 equivalents to about 1.0 equivalent with respect to carboxylic acid groups, which is a product of a polyamic acid and lithium hydroxide.

The water-soluble polyamic acid may have a pH of from about 4 to about 7.

The water-soluble polyamic acid may have an imidization ratio of from about 50% to about 90% at a curing temperature of 150° C. or less.

According to an aspect of another exemplary embodiment, a binder composition for a lithium battery includes the water-soluble polyamic acid described above and a solvent.

According to an aspect of another exemplary embodiment, a lithium battery includes:
a cathode,
an anode, and
an electrolyte disposed between the cathode and the anode,
wherein at least one of the cathode and the anode includes an electrode active material and a polyimide derived from the water-soluble polyamic acid.

According to an aspect of another exemplary embodiment, a method of preparing a water-soluble polyamic acid includes:
adding, to a polyamic acid having an acid equivalent of less than 300 grams per equivalent, lithium hydroxide in an amount of from about 0.2 equivalents to about 1.0 equivalent with respect to carboxylic acid group to partially lithiate the polyamic acid.

According to an aspect of another exemplary embodiment, a method of manufacturing an electrode for a lithium battery includes:
providing an electrode slurry including an electrode active material and the binder composition described above, and heat-treating the electrode slurry at a temperature of 150° C. or less to form the electrode for a lithium battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
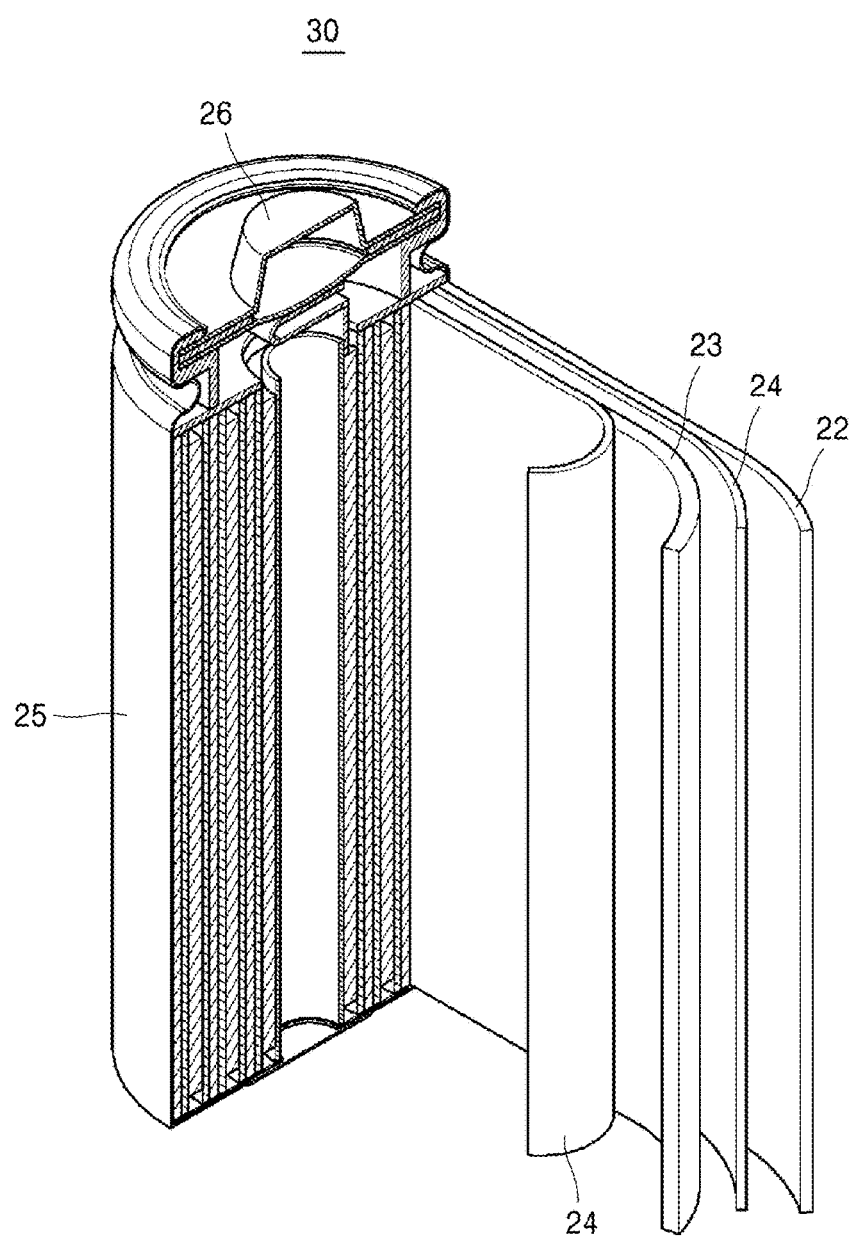
FIG. 1 is a view illustrating a structure of a lithium battery according to an embodiment.

Reference will now be made in detail to specific embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, a water-soluble polyamic acid according to an embodiment, a method of preparing the same, a binder composition for lithium batteries including the same, and a lithium battery manufactured using the binder composition will be described in more detail.

A water-soluble polyamic acid for lithium batteries according to an embodiment is a polyamic acid lithiated by using lithium hydroxide (LiOH), and has an acid equivalent of less than 300 grams per equivalent (g/eq) and a degree of lithium ion substitution of from about 0.2 equivalents to about 1.0 equivalent with respect to carboxylic acid groups.

In general, when an electrode is manufactured using a polyamic acid as a polyimide precursor, it is difficult to raise a heat treatment temperature of an electrode plate to a high temperature, e.g., 160° C. or higher, due to oxidation problems of a copper substrate. Thus, a curing rate decreases, which results in reduced imidization ratio. If the curing rate decreases, carboxyl groups of the polyamic acid directly bond to lithium ions. Thus an irreversible reaction occurs, which results in decreased initial efficiency, and the presence of unstable amide bonds may adversely affect long-term battery lifespan.

However, in the water-soluble polyamic acid, COOH groups of an polyamic acid are converted to COO$^-$Li$^+$ groups by using LiOH, and thus a high imidization ratio is obtained even at a low curing temperature. Accordingly, lifespan characteristics of a lithium battery may be enhanced. In addition, a prelithiated polyamic acid is used, and thus in the first cycle, occurrence of an irreversible reaction due to consumption of lithium ions may be suppressed, and accordingly, a decrease in initial efficiency may be prevented.

The water-soluble polyamic acid may have an imidization ratio ranging from about 50% to about 90% at a curing temperature of 150° C. or less. For example, the water-soluble polyamic acid may have an imidization ratio ranging from about 55% to about 85% at a curing temperature of 150° C. or less. The imidization ratio of the water-soluble polyamic acid may be evaluated by proton nuclear magnetic resonance ($^1$H-NMR).

According to an embodiment, the polyamic acid has an acid equivalent of less than 300 g/eq. For example, the acid equivalent of the polyamic acid may range from about 50 g/eq to about 250 g/eq. When the acid equivalent of the polyamic acid is less than 300 g/eq, the amount of carboxyl group and/or carboxylate per unit mass may increase. If the amount of carboxyl group and/or carboxylate per unit mass increases, for example, when a silicon anode active material is used as an anode material, interaction between the anode active material with hydroxyl groups on a surface thereof and a binder increases, and accordingly, adhesion of the binder to the anode active material may be enhanced. When the acid equivalent of the polyamic acid is greater than 300 g/eq, a lithium battery manufactured using the above compound may have reduced initial efficiency and deteriorated lifespan characteristics.

The degree of lithium ion substitution of the polyamic acid may be from about 0.2 equivalents to about 1.0 equivalent with respect to carboxylic acid groups. When the degree of lithium ion substitution of the polyamic acid is less than 0.2 equivalents with respect to carboxylic acid groups, the degree of prelithiation is low, and thus in the first cycle, effects of suppressing occurrence of an irreversible reaction are insignificant. In addition, when the degree of lithium ion substitution of the polyamic acid is greater than 1.0 equivalent with respect to carboxylic acid groups, the imidization rate significantly decreases, and thus lifespan characteristics of a lithium battery may deteriorate.

The degree of lithium ion substitution within the above range may be obtained by adding LiOH used to lithiate the polyamic acid in an amount of from about 0.2 equivalents to about 1.0 equivalent with respect to carboxylic acid groups.

The COOH groups of polyamic acid reacts with LiOH, so that the COOH groups are converted to COO$^-$Li$^+$ and H$_2$O is generated. As such, lithiation using LiOH may neutralize polyamic acid. Lithiation using LiOH may make polyamic acid neutral, and if lithiation is performed using LiOH in an amount of less than the equivalent of carboxylic acid groups, acidity may remain constant due to the presence of the COOH groups. Accordingly, the polyamic acid may have a pH of from about 4 to about 7 within a range within which the degree of lithium ion substitution of the polyamic acid is from about 0.2 equivalents to about 1 equivalent with respect to carboxylic acid groups.

If the amount of LiOH is greater than 1.0 equivalent with respect to the carboxylic acid groups, LiOH remaining in a binder is rendered basic in a battery, and thus the backbone chain of the binder is cut, which results in decreased molecular weight of the binder. In addition, lifespan characteristics of a lithium battery fabricated may deteriorate due to deposition or occurrence of short circuit in an electrode. If the amount of LiOH is less than 0.2 equivalents with respect to carboxylic acid groups, lithium ion substitution of the COOH groups into COO$^-$Li$^+$ may not be obtained within a desired range.

Meanwhile, when a polyamic acid is lithiated by using a lithium salt other than LiOH (e.g., LiCl), a reaction product (i.e., HCl), renders an electrode of a lithium battery acidic, and accordingly, lifespan characteristics of the lithium battery may deteriorate.

The water-soluble polyamic acid satisfies an acid equivalent of less than 300 g/eq and a degree of lithium ion substitution of from about 0.2 equivalents to about 1.0 equivalent with respect to carboxylic acid groups, and the chemical structure of a polyamic acid used to obtain such water-soluble polyamic acid is not particularly limited. The polyamic acid used to prepare the water-soluble polyamic acid may be obtained by reacting, for example, a tetracarboxylic dianhydride and diamine together.

Non-limiting examples of tetracarboxylic dianhydrides used to synthesize a polyamic acid include aliphatic tetracarboxylic dianhydrides, alicyclic tetracarboxylic dianhydrides, and aromatic tetracarboxylic dianhydrides. The aliphatic tetracarboxylic dianhydrides may be, for example, butanetetracarboxylic dianhydride and the like. The alicyclic tetracarboxylic dianhydrides may be, for example, 1,2,3,4-cyclobutanetetracarboxylic dianhydride, 2,3,5-tricarboxycyclopentylacetic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 3-oxabicyclo[3.2.1]octane-2,4-dione-6-spiro-3'-(tetrahydrofuran-2',5'-dione), 5-(2,5-dioxotetrahydro-3-furanyl)-3-methyl-3-cyclohexene-1,2-dicarboxylic anhydride, 3,5,6-tricarboxy-2-carboxymethylnorbornane-2:3,5:6-dianhydride, 2,4,6,8-tetracarboxybicyclo[3.3.0]octane-2:4,6:8-dianhydride, and 4,9-dioxatricyclo[5.3.1.0$^{2,6}$]undecane-3,5,8,10-tetraone. The atomic tetracarboxylic dianhydrides may be, for example, pyromellitic dianhydride, 3,3',4,4'-benzophenonetetracarboxylic dianhydride, and 3,3'4,4'-diphenylsulfonetetracarboxylic dianhydride.

The tetracarboxylic dianhydride used to synthesize a polyamic acid may include the aromatic tetracarboxylic dianhydride. The tetracarboxylic dianhydride may include the aromatic tetracarboxylic dianhydride alone or a mixture of the aromatic tetracarboxylic dianhydride and the alicyclic tetracarboxylic dianhydride. In the latter case, the amount of the alicyclic tetracarboxylic dianhydride may be 30 mole percent (mol %) or less, for example, 20 mol % or less, with respect to the total amount of the tetracarboxylic dianhydride.

Non-limiting examples of suitable diamines used to synthesize a polyamic acid include aliphatic diamines, alicyclic diamines, aromatic diamines, and diaminoorganosiloxanes. The aliphatic diamines may be, for example, 1,1-meta-xylenediamine, 1,3-propanediamine, tetramethylenediamine, pentamethylenediamine, hexamethylenediamine, and the like. The alicyclic diamines may be, for example, 1,4-diaminocyclohexane, 4,4'-methylene-bis(cyclohexylamine), 1,3-bis(aminomethyl)cyclohexane, and the like. The aromatic diamines may be, for example, p-phenylenediamine, 4,4'-diaminodiphenylmethane, 4,4'-diaminodiphenyl sulfide, 1,5-diaminonaphthalene, 2,2'-dimethyl-4,4'-diaminobiphenyl, 4,4'-diamino-2,2'-bis(trifluoromethyl) biphenyl, 2,7-diaminofluorene, 4,4'-diaminophenyl ether, 2,2-bis[4-(4-aminophenoxy)phenyl]propane, 9,9-bis(4-aminophenyl)fluorene, 2,2-bis[4-(4-aminophenoxy)phenyl] hexafluoropropane, 2,2-bis(4-aminophenyl)hexafluoropropane, 4,4'-(p-phenyleneisopropylidene)-bis-aniline, 4,4'-(m- phenylenediisopropylidene)bis-aniline, 1,4-bis(4-aminophenoxy)benzene, 4,4'-bis(4-aminophenoxy)biphenyl, 2,6-diaminopyridine, 3,4-diaminopyridine, 2,4-diaminopyridine, 3,6-diaminoacridine, 3,6-diaminocarbazole, N-methyl-3,6-diaminocarbazole, N-ethyl-3,6-diaminocarbazole, N-phenyl-3,6-diaminocarbazole, N, N'-bis(4-aminophenyl)-benzidine, N, N'-bis(4-aminophenyl)-N, N'-dimethylbenzidine, 1,4-bis-(4-aminophenyl)-piperazine, 3,5-diaminobenzoic acid, and the like. The diaminoorganosiloxanes may be, for example, 1,3-bis(3-aminopropyl)-tetramethyldisiloxane and the like.

The diamine used to synthesize a polyamic acid may include an aromatic diamine in an amount of about 30 mol % or greater, for example, about 50 mol % or greater, for example, about 80 mol % or greater, with respect to the total amount of the diamine.

In the synthesis of a polyamic acid, a terminal-modified polymer may be synthesized using an appropriate molecular weight adjusting agent, together with the tetracarboxylic dianhydride and the diamine described above.

The molecular weight adjusting agent may be, for example, an acid monoanhydride, a monoamine compound, a monoisocyanate compound, or the like. The acid monoanhydride may be, for example, maleic anhydride, phthalic anhydride, itaconic anhydride, n-decylsuccinic anhydride, n-dodecylsuccinic anhydride, n-tetradecylsuccinic anhydride, n-hexadecylsuccinic anhydride, or the like. The monoamine compound may be, for example, aniline, cyclohexylamine, n-butylamine, n-pentylamine, n-hexylamine, n-heptylamine, n-octylamine, or the like. The monoisocyanate compound may be, for example, phenyl isocyanate, naphthyl isocyanate, or the like.

The amount of the molecular weight adjusting agent may be about 20 parts by mass or less, for example, about 10 parts by mass or less, with respect to about 100 parts by mass of the tetracarboxylic dianhydride and the diamine used.

The amount of tetracarboxylic dianhydride used with respect to diamine used to synthesize a polyamic acid may be determined such that the amount of an acid anhydride group of tetracarboxylic dianhydride is from about 0.9 equivalents to about 1.2 equivalents, for example, from about 1.0 equivalent to about 1.1 equivalents, with respect to 1 equivalent of an amino group of diamine. The synthesis of a polyamic acid may be performed in an organic solvent at a temperature of, for example, from about −20° C. to about 150° C.

The polyamic acid may include, for example, repeating units represented by Formulae 1 to 8:

Formula 1

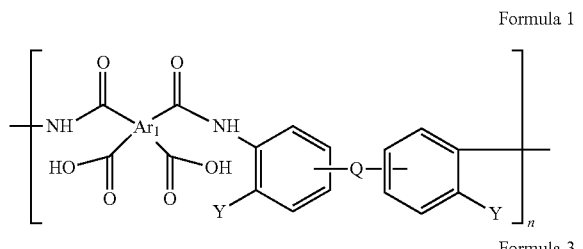

Formula 2

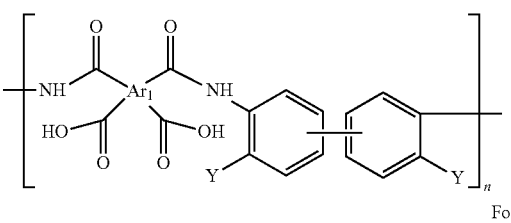

Formula 3

Formula 4

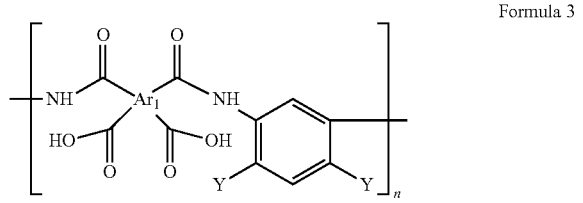

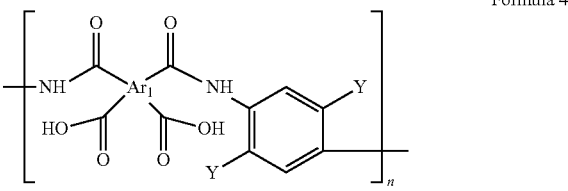

Formula 5

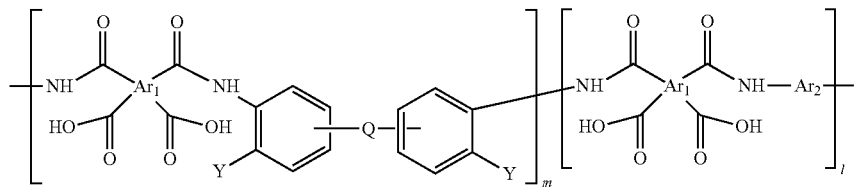

Formula 6

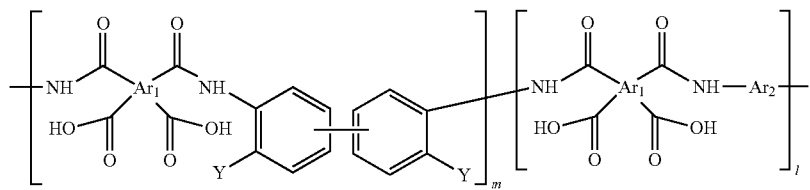

Formula 7

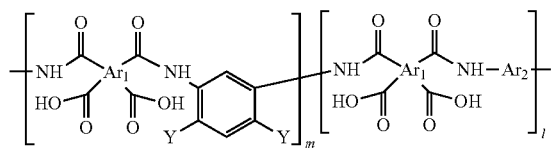

Formula 8

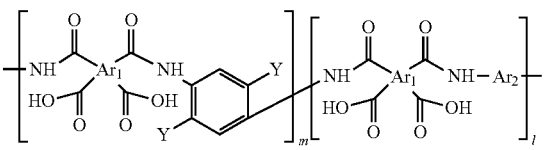

wherein in Formulae 1 to 8, $Ar_1$ is an aromatic ring group selected from substituted or unsubstituted 4-valent $C_6$-$C_{24}$ arylene groups or substituted or unsubstituted 4-valent $C_4$-$C_{24}$ heterocyclic groups, in which the aromatic ring group is singular, or at least two of the aromatic ring groups are fused to each other to form a condensed ring or are linked by a single bond or via a functional group such as O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, or C(=O)NH, $Ar_2$ is an aromatic ring group selected from substituted or unsubstituted divalent $C_6$-$C_{24}$ arylene groups or substituted or unsubstituted divalent $C_4$-$C_{24}$ heterocyclic groups, in which the aromatic ring group is singular, or at least two of the aromatic ring groups are fused to each other to form a condensed ring or are linked by a single bond or via a functional group such as O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, or C(=O)NH, Q is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, C(CH$_3$)(CF$_3$), or a substituted or unsubstituted phenylene group (wherein a substituent of the substituted phenylene group is a $C_1$-$C_6$ alkyl group or a $C_1$-$C_6$ haloalkyl group), wherein Q is linked to two opposite aromatic rings in the position of m-m, m-p, p-m, or p-p, Y is the same or different in the repeating units, and each of the Y groups is independently OH, SH, or NH$_2$, n is an integer satisfying the condition: 20≤n≤200, m is an integer satisfying the condition: 10≤m≤400, and l is an integer satisfying the condition: 10≤l≤400.

The polyamic acid is not particularly limited so long as it has a chemical structure having an acid equivalent of less than 300 g/eq.

A method of preparing a water-soluble polyamic acid, according to an embodiment includes adding, to a polyamic acid having an acid equivalent of less than 300 g/eq, from about 0.2 equivalents to about 1.0 equivalent of LiOH with respect to carboxylic acid groups to lithiate the polyamic acid.

The lithiation of the polyamic acid is as described above.

A binder composition for lithium batteries according to an embodiment includes the water-soluble polyamic acid described above and a solvent.

The binder composition may have a high curing rate even at a low temperature, e.g., about 150° C. or less and be converted to polyimide having a high adhesive strength and excellent mechanical and physical properties. The binder composition is soluble in water, and thus is environmentally friendly. It may be applied to water-involving processes used in fabrication of electrodes.

According to an embodiment, as the binder composition, the water-soluble polyamic acid may be used alone, but used in combination with other binder resins to enhance dispersibility of an active material, adhesion to an active material and a current collector, and elasticity. The water-soluble polyamic acid is soluble in water, and thus, if water is used as a solvent for dispersing the water-soluble polyamic acid, the other binder resins used have to be dissolved in water or a binder resin dispersed in water may be used. The binder resin may be, for example, at least one selected from polyvinyl alcohols, polyacrylic acids and salts thereof, polymethacrylic acids and salts thereof, polyacrylic copolymers and salts thereof, polymethacrylic copolymers and salts thereof, polyacrylamides, polyacrylamide copolymers, (denatured) butadiene rubber emulsions, (denatured) styrene-butadiene rubber emulsions, and (denatured) urethane rubber emulsions.

The amount of the water-soluble polyamic acid in the binder used may be from about 50 percent by weight (wt %) to about 100 wt % based on the total weight of the binder. When the amount of the water-soluble polyamic acid is within the above range, desired properties may be obtained. In addition, the other binder resins added to enhance properties may be added in an amount of 50 wt % or less based on the total weight of the binder.

As a solvent for dispersing the water-soluble polyamic acid, a solvent is used.

The solvent may include water. As the solvent, a polar organic solvent mixable with water, may be used, or a mixed solvent of water and a polar organic solvent may also be used. In this case, the number of other binders suitable for use in the polar organic solvent increases and thus wide ranges of options are available. However, a binder system that uses water as a solvent may be more desirable than an organic solvent in terms of environmental friendliness.

Suitable polar organic solvents may be, for example, at least one solvent selected from N,N-dimethylformamide, N,N-dimethylacetamide, methyl ethyl ketone, cyclohexanone, ethyl acetate, butyl acetate, cellosolve acetate, propylene glycol monomethyl ether acetate, methyl cellosolve, butyl cellosolve, methyl carbitol, butyl carbitol, propylene glycol monomethyl ether, diethylene glycol dimethyl ether, toluene, and xylene.

When the combination of water and a polar organic solvent is used as the solvent, a mixing volume ratio of water to the polar organic solvent may range from about 10:1 to about 1:10.

When the mixing volume ratio thereof is within the above range, LiOH may be dissolved in the mixed solvent.

The amount of the solvent is not particularly limited so long as it makes the binder composition to have an appropriate viscosity.

The binder composition may further include an additive to further enhance its properties. The additive may be, for example, a dispersant, a thickener, a conductive agent, a filler, or the like. Each additive may be mixed with the binder composition prior to preparing a slurry for forming an electrode, or may be used independently after separate preparation. In some embodiments, the additives may not be used when components to be used are determined by active material and binder components. The amount of the additive may vary according to the nature of the active material, the binder component, and the additive, and may, for example, range from about 0.1 to 10 parts by weight with respect to 100 parts by weight of the binder.

The dispersant may be selected from dispersants that are electrochemically stable, and that enhance the dispersibility of a cathode or anode active material and a conductive agent in the binder composition. The dispersant may be selected from cationic, anionic, and nonionic dispersants. The dispersant may include at least one selected from dispersants having lipophilic portions including a hydrocarbon having 5 to 20 carbon atoms, an acryl oligomer, an ethylene oxide oligomer, a propylene oxide oligomer, an ethylene oxide and propylene oxide oligomer, or a urethane oligomer.

The thickener is added when the viscosity of the binder composition is low so as to facilitate application of the binder composition on a current collector. The thickener may be, for example, at least one selected from carboxymethyl cellulose, carboxyethyl cellulose, ethyl cellulose, hydroxymethyl cellulose, hydroxyethyl cellulose, hydroxypropyl cellulose, and polyvinyl alcohol.

The conductive agent is a component for further improving the conduction path of an electrode, and is not particularly limited so long as it does not cause a chemical change in the battery fabricated and is electronically conductive. The conductive agent may be, for example, at least one material selected from natural graphite, artificial graphite, carbon nanofiber, carbon black, acetylene black, Ketjen black, and metal powders of copper, nickel, aluminum, or silver.

The filler is an auxiliary component for suppressing electrode expansion by improving the strength of the binder. The filler may be, for example, at least one selected from fibrous materials such as glass fibers, carbon fibers, and metal fibers.

A lithium battery according to another embodiment includes:

a cathode, an anode, and an electrolyte disposed between the cathode and the anode, wherein at least one of the cathode and the anode includes, as a binder, a polyimide derived from the water-soluble polyamic acid described above.

The polyimide may have an imidization rate of from about 50% to about 90%.

According to an embodiment, the anode may include a polyimide derived from the polyamic acid described above.

The anode includes an anode active material and may be manufactured by a process including, for example, preparing an anode active material composition by mixing an anode active material, a binder, optionally a conductive agent, and a solvent, and molding the anode active material composition in a predetermined shape, or coating a current collector such as a copper foil with the anode active material composition.

The anode active material may be any material that is generally used in the art. Non-limiting examples of the anode active material include lithium metal, a metal alloyable with lithium, a transition metal oxide, a material for doping or undoping lithium, and a material for reversibly intercalating or deintercalating lithium ions. In this regard, a combination (for example, a mixture) of at least two of these materials may also be used.

Non-limiting examples of the transition metal oxide include tungsten oxide, molybdenum oxide, titanium oxide, lithium titanium oxide, vanadium oxide, and lithium vanadium oxide.

Examples of the material for doping or undoping lithium include Si; $SiO_x$ wherein $0<x<2$; Si—Y alloy wherein Y is an alkali metal, an alkali earth metal, a Group 13 element, a Group 14 element, a Group 15 element, a Group 16 element, a transition metal, a rare-earth element, or a combination thereof and is not Si; Sn; $SnO_2$; and Sn—Y alloy wherein Y is an alkali metal, an alkali earth metal, a Group 13 element, a Group 14 element, a transition metal, a rare-earth element, and a combination thereof and is not Sn. Also, at least one of the materials for doping or undoping lithium may be used in combination with $SiO_2$. The element Y may be magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), dubnium (Db), chromium (Cr), molybdenum (Mo), tungsten (W), seaborgium (Sg), technetium (Tc), rhenium (Re), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The material for reversibly intercalating or deintercalating lithium ions may be any one of various carbonaceous anode active materials that are generally used in a lithium battery. Examples of the material for reversibly intercalating or deintercalating lithium ions include crystalline carbon, amorphous carbon, and combinations thereof. Non-limiting examples of the crystalline carbon include natural graphite and artificial graphite, each of which has an amorphous shape, a plate shape, a flake shape, a spherical shape, or a fiber shape. Non-limiting examples of the amorphous carbon include soft carbon (low-temperature calcined carbon), hard carbon, meso-phase pitch carbide, and calcined coke.

According to an embodiment, the anode active material may be any one of various high-capacity active materials, for example, silicon active materials such as Si, $SiO_x$ wherein $0<x\le2$, and a Si—Y alloy, tin active materials such as Sn, $SnO_2$, and a Sn—Y alloy, silicon-tin alloy active materials, and silicon-carbon active materials.

Such high-capacity active material may not be separated due to the water-soluble binder bonded between active material particles even during expansion and construction of the active material, and may maintain an electron transfer path in an electrode and accordingly, rate characteristics of the lithium battery may be enhanced.

The anode active material may further include a carbonaceous anode active material, in addition to the above-listed anode active materials, e.g., a silicon active material, a tin active material, a silicon-tin alloy active material, a silicon-carbon complex, a tin-carbon complex, or a combination thereof. In this case, the anode active material may be a mixture or composite of the carbonaceous anode active material with one of the silicon active material, the tin active material, the silicon-tin alloy active material, the silicon-carbon complex, the tin-carbon complex, and a combination thereof.

The anode active material may have a simple particulate form, or may be a nanostructure having a nanosize. In some embodiments, the anode active material may have any of various forms, for example, nanoparticles, nanowires, nanorods, nanotubes, or nanobelts.

A binder used in the anode active material composition may include the water-soluble polyamic acid according to an embodiment, and thus volumetric expansion of the anode active material occurring during lithium charging and discharging may be suppressed. The amount of the binder including the water-soluble polyamic acid may range from about 1 part by weight to about 20 parts by weight, for example, from about 2 parts by weight to about 10 parts by weight, based on 100 parts by weight of the anode active material.

The anode may further optionally include a conductive agent to further enhance electrical conductivity. The conductive agent may be any conductive agent generally used in lithium batteries. Non-limiting examples of suitable conductive agents include carbonaceous materials such as carbon black, acetylene black, Ketjen black, and carbon fibers (e.g., gas phase grown carbon fibers); metallic materials such as metal powders or fibers of copper, nickel, aluminum, or silver; conductive polymers such as polyphenylene derivatives; and mixtures thereof. The amount of the conductive agent may be appropriately adjusted.

The solvent may be N-methylpyrrolidone (NMP), acetone, water, or the like. The amount of the solvent may range from about 10 parts by weight to about 300 parts by weight based on 100 parts by weight of the anode active material. When the amount of the solvent is within the above range, processes for forming an active material layer are easily performed.

In some embodiments, the anode active material composition may further include other additives, for example, an adhesion promoter such as a silane coupling agent for enhancing adhesion between a current collector and an active material, a dispersant for enhancing the dispersibility of a slurry, and the like.

In addition, an anode current collector is generally fabricated to have a thickness of from about 3 μm to about 10 μm. The anode current collector is not particularly limited so long as it causes no chemical change in the fabricated battery and has conductivity. Non-limiting examples of the anode current collector include copper, stainless steel, aluminum, nickel, titanium, sintered carbon, copper or stainless steel that is surface-treated with carbon, nickel, titanium, or silver, and aluminum-cadmium alloys. In addition, the anode current collector may be processed to have fine irregularities on surfaces thereof so as to enhance the adhesion of the current collector to the anode active material, and may be used in any of various forms including films, sheets, foils, nets, porous structures, foams, and non-woven fabrics.

The anode active material composition may be coated directly on a current collector to manufacture an anode plate. In some embodiments, the anode plate may be manufactured by casting the anode active material composition on a separate support to form an anode active material film, separating the film from the support, and laminating the anode active material film on a copper foil current collector. The fabrication methods of the anode are not limited to the above examples and the anode may be manufactured by one of various other methods.

Separately, a cathode active material composition prepared by mixing a cathode active material, a conductive agent, a binder, and a solvent is prepared to manufacture a cathode.

As the cathode active material, a compound enabling reversible intercalation and deintercalation of lithium may be used. The cathode active material may be any lithium-containing metal oxide that is commonly used in the art.

For example, the cathode active material may be a compound represented by any one of Formulae: $Li_aA_{1-b}B'_bD'_2$ wherein $0.90 \leq a \leq 1.8$ and $0 \leq b \leq 0.5$; $Li_aE_{1-b}B'_bO_{2-c}D'_c$ wherein $0.90 \leq a \leq 1.8$, $0 \leq b \leq 0.5$, and $0 \leq c \leq 0.05$; $LiE_{2-b}B'_bO_{4-c}D'_c$ wherein $0 \leq b \leq 0.5$ and $0 \leq c \leq 0.05$; $Li_aNi_{1-b-c}Co_bB'_cD'_\alpha$ wherein $0.90 \leq a \leq 1.8$, b 0.5, $0 \leq c \leq 0.05$, and $0 \leq \alpha \leq 2$; $Li_aNi_{1-b-c}Co_bB'_cO_{2-\alpha}F'_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bB'_cO_{2-\alpha}F'_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bB'_cD'_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Mn_bB'_cO_{2-\alpha}F'_\alpha$ wherein $0.90 \leq a \leq 1.8$, $0 \leq b \leq 0.5$, $0 \leq c \leq 0.05$, and $0 \leq \alpha \leq 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ wherein $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ wherein $0 \leq f \leq 2$; $Li_{(3-f)}Fe_2(PO_4)_3$ wherein $0 \leq f \leq 2$; and $LiFePO_4$.

In the formulae above, A is nickel (Ni), cobalt (Co), manganese (Mn), or a combination thereof; B' is aluminum (Al), Ni, Co, Mn, chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof.

The cathode active material may be at least one selected from, for example, lithium cobalt oxide ($LiCoO_2$); lithium nickel oxide ($LiNiO_2$); lithium manganese oxides such as compounds of Formula $Li_{1+x}Mn_{2-x}O_4$ wherein $0 \leq x \leq 0.33$, $LiMnO_3$, $LiMn_2O_3$, and $LiMnO_2$; lithium copper oxide ($Li_2CuO_2$); lithium iron oxide ($LiFe_3O_4$); lithium vanadium oxide such as $LiV_3O_8$; copper vanadium oxide such as $Cu_2V_2O_7$; vanadium oxide such as $V_2O_5$; lithium nickel oxides having the formula $LiNi_{1-x}M_xO_2$ wherein M is Co, Mn, Al, Cu, Fe, Mg, B, or Ga and $0.01 \leq x \leq 0.3$; manganese composite oxides having the formula $LiMn_{2-x}M_xO_2$ wherein M is Co, Ni, Fe, Cr, Zn, or Ta and $0.01 \leq x \leq 0.1$ or the formula $Li_2Mn_3MO_8$ wherein M is Fe, Co, Ni, Cu, or Zn; lithium manganese oxide such as $LiMn_2O_4$, Li atoms of which are partially substituted with alkali earth metal ions; disulfide compounds; and iron molybdenum oxide ($Fe_2(MoO_4)_3$).

The compounds described above may have a coating layer on their surfaces. The coating layer may include a coating element compound, such as an oxide of a coating element, a hydroxide of a coating element, an oxyhydroxide of a coating element, an oxycarbonate of a coating element, or a hydroxy carbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or a combination thereof. A coating layer may be formed using the coating elements in the aforementioned compounds by using any one of various methods that do not adversely affect physical properties of the positive active material (e.g., spray coating or immersion). For example, the coating element compound may be $LiNiO_2$, $LiCoO_2$, $LiMn_xO_{2x}$ wherein x=1 or 2, $LiNi_{1-x}Mn_xO_2$ wherein $0<x<1$, $LiNi_{1-x-y}Co_xMn_yO_2$ wherein $0 \leq x \leq 0.5$ and $0 \leq y \leq 0.5$, $LiFeO_2$, $V_2O_5$, TiS, MoS, or the like.

The binder used in the cathode active material composition may be any binder that satisfactorily adheres cathode active material particles to each other and satisfactorily attaches the cathode active material to a current collector. For example, the binder may be at least one selected from polyvinylalcohol, carboxymethylcellulose, hydroxypropylcellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubber, polyamideimide, acrylated styrene-butadiene rubber, an epoxy resin, and nylon.

The binder used in the cathode active material composition may be the same as that used in the anode active material composition.

The conductive agent and the solvent used to prepare the cathode active material composition may be the conductive agent and the solvent described above used for the anode active material composition. In some embodiments, a plasticizer may be further added to the cathode active material composition and the anode active material composition to form pores in electrode plates. The amounts of the cathode active material, the conductive agent, the binder, and the solvent are the amounts generally used in lithium batteries.

A cathode current collector is generally fabricated to have a thickness of from about 3 micrometers (μm) to about 100 μm. The cathode current collector is not particularly limited so long as it causes no chemical change in the fabricated battery and has high conductivity. Non-limiting examples of the cathode current collector include stainless steel, aluminum, nickel, titanium, sintered carbon, and aluminum or stainless steel that is surface-treated with carbon, nickel, titanium, or silver. In addition, the cathode current collector may be processed to have fine irregularities on a surface thereof so as to enhance the adhesion of the cathode current collector to the cathode active material, and may be used in any of various forms including films, sheets, foils, nets, porous structures, foams, and non-woven fabrics.

The cathode active material composition may be directly coated on a cathode current collector and dried to prepare a cathode plate. In another embodiment, the cathode active material composition may be cast on a separate support to form a cathode active material film, which may then be separated from the support and laminated on a cathode current collector to prepare a cathode plate.

The cathode and the anode may be separate from each other by a separator, and any separator commonly used in lithium batteries may be used. In particular, a separator having low resistance to transfer of ions in an electrolyte and having an excellent electrolyte-retaining ability may be used. As the separator, an insulating thin film having high ion permeability and mechanical strength may be used.

The separator may generally have a pore diameter of from about 0.01 μm to about 10 μm, and generally have a thickness of about 5 μm to about 300 μm. Examples of the separator include sheets or non-woven fabrics made of an olefin polymer, e.g., polypropylene, polyethylene, or the like, or glass fibers. When a solid polymer electrolyte is used as an electrolyte, the solid polymer electrolyte may also serve as a separator.

The separator made of an olefin polymer may be, for example, a single layer of polyethylene, polypropylene, or polyvinylidene fluoride or multiple layers of at least two of these materials, or a mixed multi-layer, such as a polyethylene/polypropylene layer, a polyethylene/polypropylene/polyethylene layer, or a polypropylene/polyethylene/polypropylene layer.

A lithium salt-containing non-aqueous electrolyte may be used as an electrolyte. The non-aqueous electrolyte may be a non-aqueous electrolytic solution, an organic solid electrolyte, or an inorganic solid electrolyte.

Non-limiting examples of the non-aqueous electrolyte may be aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Non-limiting examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Non-limiting examples of the inorganic solid electrolyte include nitrides, halides and sulfates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt commonly used in lithium batteries and is a material that is readily soluble in the non-aqueous electrolyte. The lithium salt may be, for example, at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexamethyl phosphoramide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some embodiments, in order to impart incombustibility, the electrolyte may further include a halogen-containing solvent such as carbon tetrachloride and ethylene trifluoride.

Lithium batteries may be classified as lithium ion batteries, lithium ion polymer batteries, and lithium polymer batteries according to the types of separator and electrolyte included therein. In addition, lithium batteries may be classified as cylindrical type, rectangular type, coin type, and pouch type batteries according to the shape thereof and as bulk type and thin-film type according to the size thereof. In addition, the lithium battery manufactured may be either a lithium primary battery or a lithium secondary battery.

The lithium battery may be a lithium ion battery. For example, the lithium battery may be a lithium ion battery charged to 4.3 Volts (V) or higher.

The lithium battery may be suitable for use as a power source for electric vehicles requiring high capacity, high-power output, and operation under high temperature conditions, in addition to power sources for existing mobile phones and portable computers, and may be coupled to existing internal combustion engines, fuel cells, or supercapacitors to be used in hybrid vehicles. In addition, the lithium battery may be used in all applications requiring high-power output, high voltage, and operation under high temperature conditions.

Methods of preparation of these lithium batteries are apparent to one of ordinary skill in the art, and thus, a detailed description thereof will not be provided herein.

FIG. 1 is a schematic view illustrating a structure of a lithium battery 30 according to an embodiment.

Referring to FIG. 1, the lithium battery 30 includes a cathode 23, an anode 22, and a separator 24 disposed between the cathode 23 and the anode 22. The cathode 23, the anode 22, and the separator 24 are wound or folded, and then accommodated in a battery case 25. Subsequently, an electrolyte is injected into the battery case 25, and the battery case 25 is sealed by a sealing member 26, thereby completing the manufacture of the lithium battery 30. The lithium case 25 may have a cylindrical shape, a rectangular shape, or a thin-film shape.

According to an embodiment, a separator may be disposed between the cathode and the anode to form a battery assembly. A plurality of battery assemblies may be stacked in a bi-cell structure and impregnated with an organic electrolytic solution, and the resultant structure may be placed into a pouch and hermetically sealed, thereby completing the manufacture of a lithium ion polymer battery.

In addition, the battery assemblies may be stacked to form a battery pack, and such battery pack may be used in any devices requiring high capacity and high-power output. For example, the battery pack may be used in notebook computers, smart phones, electric vehicles, and the like.

In particular, the lithium secondary battery has excellent high-rate characteristics and lifespan characteristics, and thus is suitable for use in electric vehicles (EVs). For example, the lithium secondary battery may be used in hybrid vehicles such as a plug-in hybrid electric vehicle (PHEV) or the like.

Hereinafter, one or more embodiments will be described in further detail with reference to the following examples and comparative examples. These examples are for illustrative purposes only and do not intend to limit the scope of the embodiments.

Example 1: Amount of LiOH and Comparison According to Use of Lithium Salt

Example 1-1

(1) Preparation of Water-Soluble Polyamic Acid

A polyamic acid represented by Formula 9 below was prepared as follows. First, a 3-neck round bottom flask was filled with nitrogen, 8.6154 grams (g) (0.0430 moles (mol)) of 4,4'-oxydianiline (ODA) was added thereto, followed by addition of 102 g of N-methylpyrrolidone (NMP). The resulting solution was completely dissolved using a mechanical stirrer. Thereafter, 9.3846 g (0.0430 mol) of pyromellitic dianhydride (PMDA) was added to the resultant and stirred at room temperature for 24 hours.

10 g of an aqueous LiOH solution (0.25 equivalents with respect to carboxylic acid groups of the prepared polyamic acid) was added to the prepared polyamic acid (PMDA/ODA, acid equivalent: 210 g/eq, n=100 to 10000) so that 0.25 equivalents of COOH groups of the polyamic acid were converted to COO⁻Li⁺ groups, thereby completing the preparation of a water-soluble polyamic acid.

(2) Manufacture of Anode and Lithium Battery

A Si—C composite (average particle diameter: 15 micrometers (μm), available from Shinetsu) as an anode active material, artificial graphite, and the water-soluble polyamic acid prepared above as a binder were mixed in a weight ratio of 25:67:8 to prepare an anode slurry.

The anode slurry was coated on a Cu foil current collector having a thickness of 10 μm to manufacture an anode plate, the coated anode plate was dried at 110° C. for 1 hour, followed by further drying in a vacuum oven at 150° C. for 2 hours. The dried anode plate was then pressed using a press so as to have a mass density of 1.57 grams per cubic centimeter (g/cc) and a thickness of 660 μm, thereby completing the manufacture of an anode.

The manufactured anode, Li metal as a counter electrode, a polypropylene separator (Cellgard® 3510), and an electrolyte prepared by dissolving 1.3 molar (M) LiPF$_6$ in a mixed solvent of ethylene carbonate (EC), fluoroethyl carbonate (FEC), and diethyl carbonate (DEC) in a volume ratio of 2:2:6 were used to manufacture a CR-2032 type coin half-cell.

Example 1-2

An anode and a lithium battery were manufactured in the same manner as in Example 1, except that the aqueous LiOH solution was added in an amount of 0.5 equivalents with respect to carboxylic acid groups of the prepared polyamic acid to prepare a water-soluble polyamic acid.

Example 1-3

An anode and a lithium battery were manufactured in the same manner as in Example 1, except that the aqueous LiOH solution was added in an amount of 0.75 equivalents with respect to carboxylic acid groups of the prepared polyamic acid to prepare a water-soluble polyamic acid.

Comparative Example 1-1

An anode and a lithium battery were manufactured in the same manner as in Example 1, except that a non-lithiated polyamic acid was used as a binder.

Comparative Example 1-2

An anode and a lithium battery were manufactured in the same manner as in Example 1, except that the aqueous LiOH

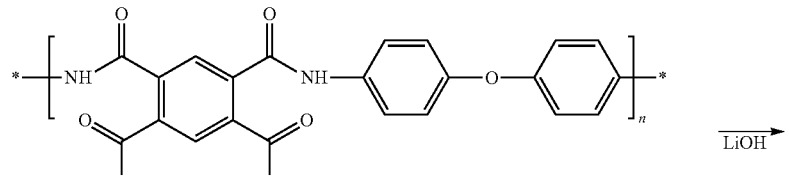

Formula 9

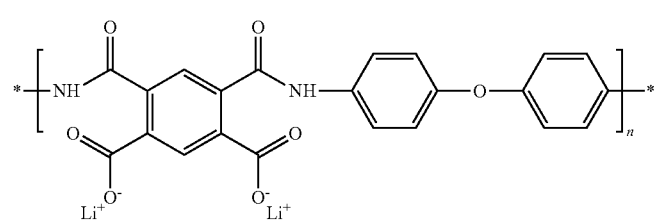

solution was added in an amount of 1.0 equivalent with respect to carboxylic acid groups of the prepared polyamic acid to prepare a water-soluble polyamic acid.

Comparative Example 1-3

An anode and a lithium battery were manufactured in the same manner as in Example 1, except that the aqueous LiOH solution was added in an amount of 1.5 equivalents with respect to carboxylic acid groups of the prepared polyamic acid to prepare a water-soluble polyamic acid.

Comparative Example 1-4

An anode and a lithium battery were manufactured in the same manner as in Example 1, except that an aqueous LiCl solution was added instead of the aqueous LiOH solution in an amount of 0.5 equivalents with respect to carboxylic acid groups of the prepared polyamic acid to prepare a polyamic acid.

Comparative Example 1-5

An anode and a lithium battery were manufactured in the same manner as in Example 1, except that an aqueous LiCl solution was added instead of the aqueous LiOH solution in an amount of 1.0 equivalent with respect to carboxylic acid groups of the prepared polyamic acid to prepare a polyamic acid.

Evaluation 1: Water Solubility Evaluation

Figure 2:
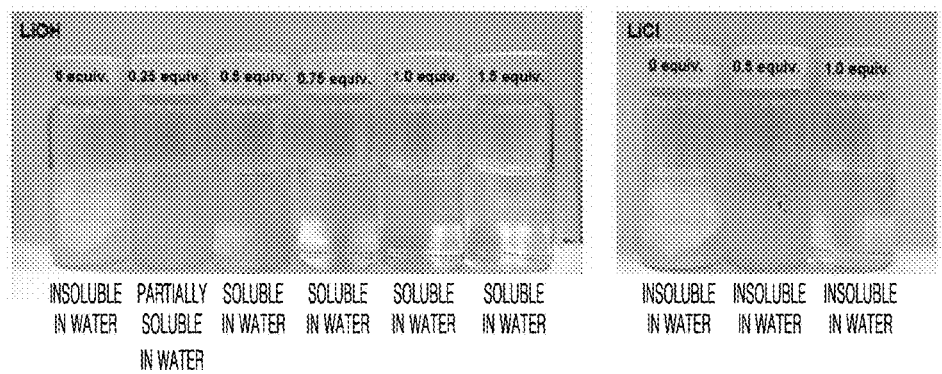
FIG. 2 provides photographs showing water solubility test results of polyamic acids prepared according to Examples 1-1 to 1-3 and Comparative Examples 1-2 and 1-3.

To test whether the polyamic acids prepared according to Examples 1-1 to 1-3 and Comparative Examples 1-1 to 1-5 are soluble in water, each polyamic acid was precipitated in methanol to obtain a powder, the powder was filtered, and the filtrate was dried in a vacuum oven at 30° C. for 24 hours. Subsequently, 1 g of the dried powder was added to 10 milliliters (ml) of pure water and mixed therein. Photographs for water solubility test results of each polyamic acid are shown in FIG. 2.

As follows from FIG. 2, the polyamic acids of Examples 1-1 to 1-3 and Comparative Examples 1-2 and 1-3 are soluble in water, while the non-lithiated polyamic acid of Comparative Example 1-1 and the polyamic acids having been lithiated by using a lithium salt (e.g., LiCl) of Comparative Examples 1-4 and 1-5 are insoluble in water.

Evaluation Example 2: Imidization Ratio Evaluation

An imidization ratio (conversion of polyamic acid to polyimide) of the polyamic acid of each of the anodes manufactured according to Examples 1-1 to 1-3 and Comparative Examples 1-1 to 1-5 was evaluated by $^1$H-NMR.

To measure the imidization ratio, each polyamic acid was prepared as a film on a glass substrate. A sample heat-treated at 350° C. for 1 hour was used as a reference, and each film prepared was analyzed by the Fourier transform infrared (FTIR) spectroscopy to obtain an area ratio of particular peaks. The imidization ratio of each polyamic acid was calculated using the area ratio of particular peaks.

The imidization ratio is defined as Equation 1 below:

$$\text{Conversion to } PI(\%) = \frac{(D^{-1}_{1380\ cm}/D^{-1}_{1500\ cm})_T}{(D^{-1}_{1380\ cm}/D^{-1}_{1500\ cm})_{350°\ C.}} \times 100. \quad \text{Equation 1}$$

In Equation 1, $D_{1500\ cm^{-1}}$ is the intensity of a peak corresponding to C—C stretching of p-substituted benzene, and $D_{1380\ cm^{-1}}$ is the intensity of a peak corresponding to C—N stretching vibration of an imide group.

The imidization ratio of the polyamic acid of each anode is shown in Table 1 below.

Evaluation Example 3: Evaluation of Mechanical and Physical Properties

Mechanical and physical properties of each of the polyamic acids of Examples 1-1 to 1-3 and Comparative Examples 1-1 to 1-5 were evaluated as below.

Extension, recovery, and hardness of each polyamic acid were measured using a microindenter (DUH-211, available from Shimadzu). A sample was prepared on a glass substrate to have a size of 5×5 (square centimeters, cm$^2$) and a thickness of 50 μm, and a force of 10 milli Newtons (mN) was used on the sample.

Shear modulus (G'), loss modulus (G''), and tan δ of each polyamic acid were measured using a dynamic mechanical analyzer (DMA, available from Anton PAAR). A sample was prepared to have a size of 1×1 (cm$^2$) and a thickness of 50 μm and the measurement was performed under conditions: at a temperature of 0° C. to 120° C. and a rotation rate of 1 radian per second (rad/s).

Evaluation results of the extension, recovery, modulus and hardness of each polyamic acid are shown in Table 1 below.

Evaluation Example 4: Cell Characteristics Evaluation

Initial efficiency and lifespan characteristics of each lithium battery manufactured according to Examples 1-1 to 1-3 and Comparative Examples 1-1 to 1-5 were evaluated as below.

First, each lithium battery was charged under conditions: CC-CV mode 0.2 Coulombs (C), 4.2 Volts per 0.05 Coulombs (V/0.05 C) cut-off and then discharged under conditions: CC-mode 0.2 Coulombs per 2.5 Volt (C/2.5 V) cut-off. This cycle of charging and discharging processes is a formation process. Subsequently, each lithium battery was charged under conditions: CC-CV mode 1.0 C, 4.2 V/0.05 C cut-off and then discharged under conditions: CC-mode 1.0 C/2.5 V cut-off. This cycle of charging and discharging processes was repeated 100 times, and a capacity retention ratio (CRR) of each lithium battery according to charging and discharging was evaluated.

Figure 3A:
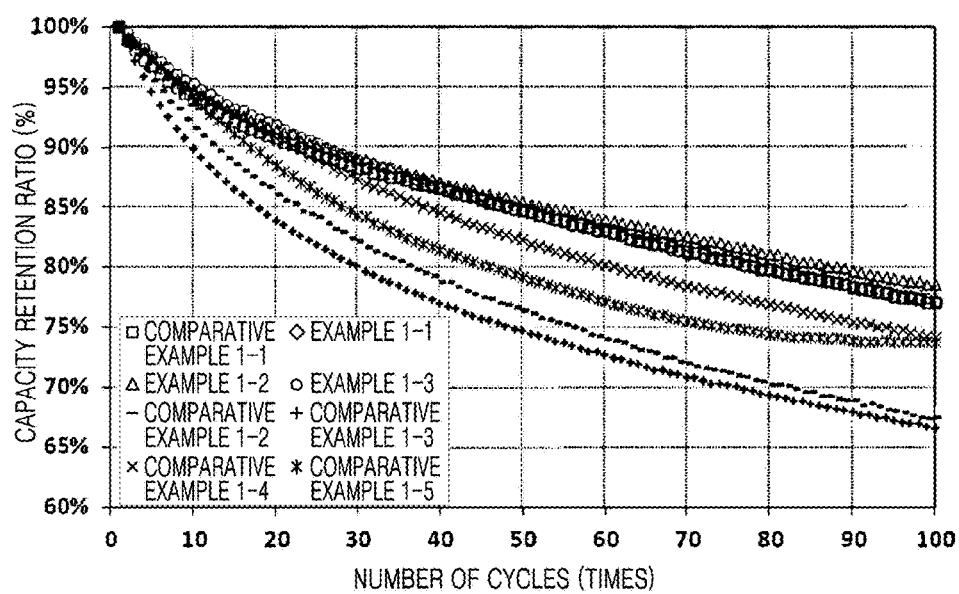
FIGS. 3A and 3B are graphs showing capacity retention ratio (CRR) evaluation results of lithium batteries manufactured according to Examples 1-1 to 1-3 and Comparative Examples 1-1 to 1-5.
Figure 3B:
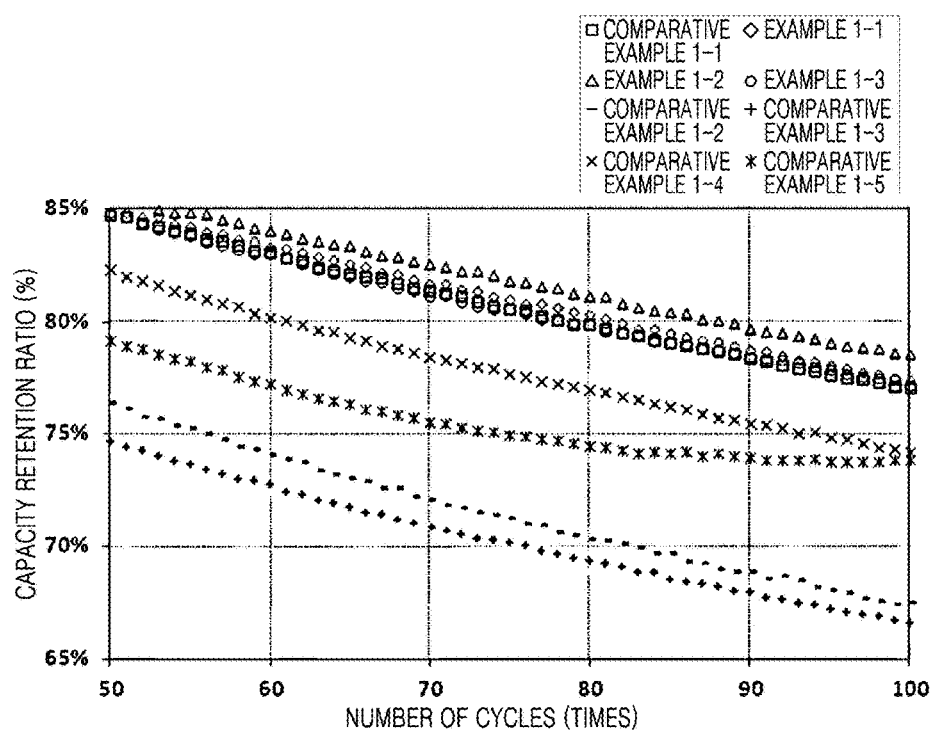

Graphs showing the CRR evaluation results are illustrated in FIGS. 3A and 3B, and initial efficiency and a CRR at 100$^{th}$ cycle of each lithium battery are shown in Table 1 below. Here, the initial efficiency is defined by Equation 2 below and the CRR is defined by Equation 3 below:

Initial efficiency [%]=[discharge capacity at 1$^{st}$ cycle/charge capacity at 1$^{st}$ cycle]×100    Equation 2

Capacity retention ratio [%]=[discharge capacity at each cycle/discharge capacity at 1$^{st}$ cycle]×100    Equation 3

TABLE 1

| Example/ Comparative Example | Amount of LiOH (equiv.) | Imidization ratio % | Mechanical and physical properties Microindenter | | | | Cell characteristics | | | |
|---|---|---|---|---|---|---|---|---|---|---|
| | | | Extension mm | Recovery % | Modulus MPa | Hardness N/mm² | Initial efficiency 0.1 C % | Discharge capacity 0.1 C mAh/g | Discharge capacity 0.2 C mAh/g | CRR 1.0 C 100 times % |
| Comp. Example 1-1 | 0 | 63 | 1.30 | 37.3 | 3357 | 150 | 79.1 | 569 | 580 | 77.0 |
| Example 1-1 | 0.25 | 75 | 1.24 | 36.2 | 3923 | 164 | 79.4 | 556 | 570 | 77.4 |
| Example 1-2 | 0.5 | 85 | 1.29 | 34.1 | 4615 | 164 | 80.9 | 557 | 570 | 78.5 |
| Example 1-3 | 0.75 | 73 | 1.35 | 30.6 | 4021 | 148 | 82.9 | 586 | 589 | 77.2 |
| Comp. Example 1-2 | 1.0 | 14.2 | 1.68 | 25.5 | 3200 | 101 | 84.2 | 570 | 579 | 67.5 |
| Comp. Example 1-3 | 1.5 | 13.2 | 1.63 | 26.1 | 3234 | 106 | 83.8 | 553 | 569 | 66.6 |
| Comp. Example 1-4 | LiCl 0.5 | 78.3 | 10.68 | 20.0 | 318 | 2.8 | 81.3 | 584 | 585 | 74.2 |
| Comp. Example 1-5 | LiCl 1.0 | 71.7 | 9.68 | 17.5 | 257 | 3.3 | 84.9 | 579 | 583 | 73.9 |

As shown in Table 1 above, the polyamic acids of Examples 1-1 to 1-3 exhibit a higher imidization ratio even at a curing temperature of 150° C. than the polyamic acids of Comparative Examples 1-1 to 1-5 in the manufacture of respective anodes.

In addition, the polyamic acids of Examples 1-1 to 1-3 exhibit excellent mechanical and physical properties as compared to the polyamic acids of Comparative Examples 1-1 to 1-3. The polyamic acids of Comparative Examples 1-4 and 1-5 exhibited high extension and recovery, while exhibiting significantly reduced Modulus and hardness, as compared to the other polyamic acids.

In addition, as shown in Table 1 and FIGS. 3A and 3B, the lithium batteries of Examples 1-1 to 1-3 had higher initial capacity and capacity retention ratio than the lithium batteries of Comparative Examples 1-1 to 1-5.

Example 2: Experiment of Comparison with Commercially Available Binder

Example 2-1

An anode and a lithium battery were manufactured in the same manner as in Example 1, except that the aqueous LiOH solution was added in an amount of 0.25 equivalents with respect to carboxylic acid groups of the prepared polyamic acid.

Comparative Example 2-2

An anode and a lithium battery were manufactured in the same manner as in Example 1, except that lithium polyacrylate (LiPAA) was used as a binder.

Comparative Example 2-3

An anode and a lithium battery were manufactured in the same manner as in Example 1, except that a mixed binder of styrene-butadiene rubber (SBR) and carboxyl methyl cellulose (CMC) in a weight ratio of 1:1 was used.

Evaluation Example 5: Evaluation of Mechanical and Physical Properties

Mechanical and physical properties of the binders of Example 2-1 and Comparative Examples 2-1 and 2-2 were evaluated as in Evaluation Example 3, and the evaluation results are shown in Table 2 below.

In addition, dynamic properties of each binder were evaluated using a dynamic mechanical analyzer (DMA) (DMA 2980, available from TA Instrument). The dynamic mechanical properties of each binder were observed at a frequency of 1 Hertz (Hz), a temperature ranging from 25° C. to 80° C., and a heating rate of 2 degree Centigrade per minute (° C./min). Storage modulus (G') evaluation results of each binder at 25° and 80° C. are shown in Table 2 below:

TABLE 2

| Example/ Comparative Example | Binder | Physical properties | | | | | |
|---|---|---|---|---|---|---|---|
| | | Microindenter | | | | DMA | |
| | | Extension mm | Recovery % | Modulus MPa | Hardness N/mm² | G'(25° C.) MPa | G'(80° C.) MPa |
| Example 2-1 | PMDA/ODA LiOH 0.5 equiv. | 1.06 | 34.3 | 6921 | 244 | 19.19 | 15.7 |

TABLE 2-continued

| Example/Comparative Example | Binder | Physical properties | | | | | |
|---|---|---|---|---|---|---|---|
| | | Microindenter | | | | DMA | |
| | | Extension mm | Recovery % | Modulus MPa | Hardness N/mm² | G'(25° C.) MPa | G'(80° C.) MPa |
| Comparative Example 2-2 | LiPAA | 0.82 | 19.8 | 16849 | 449 | 21.77 | 2.83 |
| Comparative Example 2-3 | SBR/CMC | 1.47 | 17.2 | 3106 | 122 | 17.05 | 6.87 |

As shown in Table 2 above, the polyamic acid of Example 2-1 exhibited excellent recovery and solid properties as compared to the commercially available binders of Comparative Examples 2-2 and 2-3.

Evaluation Example 6: Cell Characteristics Evaluation

Cell characteristics of the lithium batteries manufactured according to Example 2-1 and Comparative Examples 2-1 and 2-2 were evaluated as in Evaluation Example 4, and the evaluation results thereof are shown in Tables 3 and 4 below.

TABLE 3

| Example/Comparative Example | Binder | Cell characteristics | | | |
|---|---|---|---|---|---|
| | | Initial efficiency 0.1 C % | Discharge capacity 0.1 C mAh/g | Discharge capacity 0.2 C mAh/g | CRR 1.0 C 100 times % |
| Example 2-1 | PMDA/ODA LiOH 0.5 equiv. | 80.9 | 557 | 570 | 78.5 |
| Comparative Example 2-2 | LiPAA | 86.6 | 622 | 616 | 67.5 |
| Comparative Example 2-3 | SBR/CMC | 79.7 | 585 | 591 | 70.5 |

Figure 4:
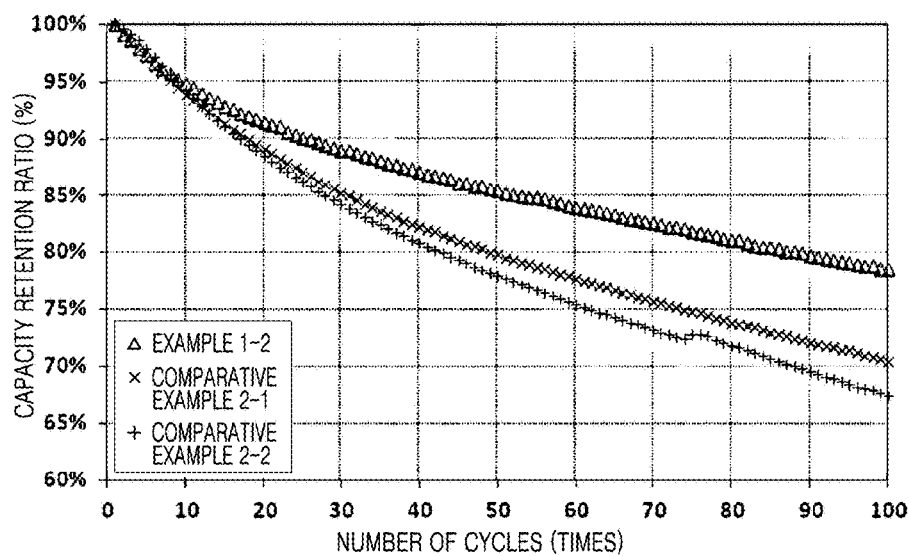
FIG. 4 is a graph showing CRR evaluation results of lithium batteries manufactured according to example 2-1 and Comparative Examples 2-1 and 2-2.

As shown in Table 3 above and FIG. 4, the lithium battery of Example 2-1 exhibited a high capacity retention ratio, while exhibiting a low initial efficiency, as compared to the commercially available binders of Comparative Examples 2-2 and 2-3.

Example 3: Comparison of Acid Equivalents of Polyamic Acids

Example 3-1

A water-soluble polyamic acid was prepared by adding, to a polyamic acid represented by Formula 10 below (PMDA/DABA, acid equivalent: 124 g/eq, and n=100 to 10000), an aqueous LiOH solution in an amount of 0.5 equivalents with respect to carboxylic acid groups of the polyamic acid.

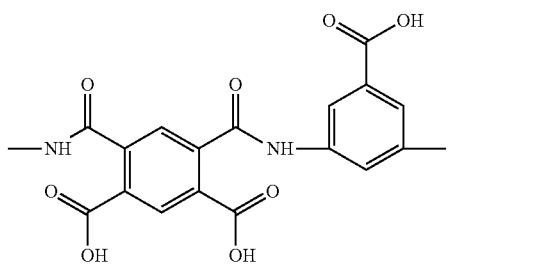

Formula 10

An anode and a lithium battery were manufactured in the same manner as in Example 1 by using the water-soluble polyamic acid prepared according to Example 3-1.

Example 3-2

An anode and a lithium battery were manufactured in the same manner as in Example 1-2 by using a water-soluble polyamic acid prepared by adding an aqueous LiOH solution in an amount of 0.5 equivalents with respect to carboxylic acid groups of the polyamic acid (PMDA/ODA, acid equivalent: 210 g/eq, and n=100 to 10000).

Comparative Example 3-3

A water-soluble polyamic acid was prepared by adding, to a polyamic acid represented by Formula 11 below (6 FDA/ODA, acid equivalent: 322 g/eq, and n=100 to 10000), an aqueous LiOH solution in an amount of 0.5 equivalents with respect to carboxylic acid groups of the polyamic acid.

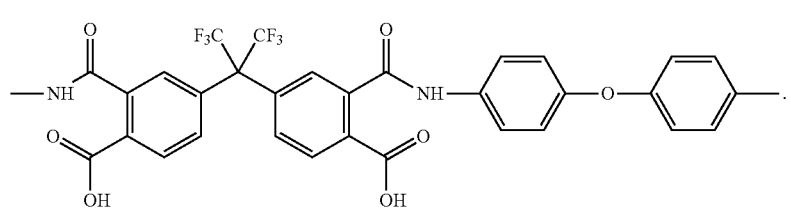

Formula 11

An anode and a lithium battery were manufactured in the same manner as in Example 1 by using the water-soluble polyamic acid prepared according to Comparative Example 3-3.

Comparative Example 3-4

A water-soluble polyamic acid was prepared by adding, to a polyamic acid represented by Formula 12 below (BPADA/ODA, acid equivalent: 322 g/eq, and n=100 to 10000), an aqueous LiOH solution in an amount of 0.5 equivalents with respect to carboxylic acid groups of the polyamic acid.

Example 4: Curing Temperature Comparison

Example 4-1

A lithium battery was manufactured in the same manner as in Example 1-1, except that the curing temperature was 110° C. in the manufacture of an anode.

Example 4-2

A lithium battery was manufactured in the same manner as in Example 1-1, except that the curing temperature was 130° C. in the manufacture of an anode.

Formula 12

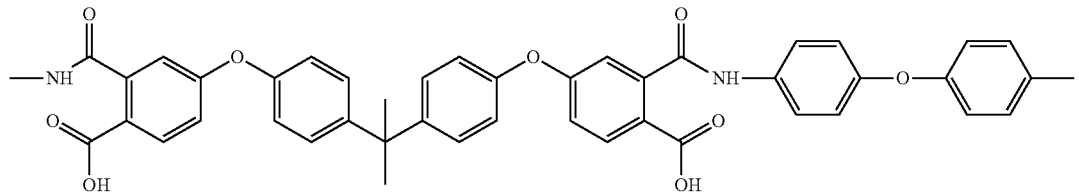

An anode and a lithium battery were manufactured in the same manner as in Example 1 by using the water-soluble polyamic acid prepared according to Comparative Example 3-4.

Evaluation Example 7: Cell Characteristics Evaluation

Cell characteristics of the lithium batteries manufactured according to Examples 3-1 and 3-2 and Comparative Examples 3-3 and 3-4 were evaluated as in Evaluation Example 4, and the evaluation results thereof are shown in Table 4 below and FIG. 5.

In addition, an expansion rate of the anode of each of the lithium batteries of Examples 3-1 and 3-2 and Comparative Examples 3-3 and 3-4 was evaluated by measuring the thickness of an anode plate after the first formation process, and the results thereof are shown in Table 4 below.

Example 4-3

A lithium battery was manufactured in the same manner as in Example 1-1, except that the curing temperature was 150° C. in the manufacture of an anode.

Comparative Example 4-4

A lithium battery was manufactured in the same manner as in Example 1-1, except that the curing temperature was 350° C. in the manufacture of an anode.

Evaluation Example 8: Cell Characteristics Evaluation

Imidization ratios of the lithium batteries manufactured according to Examples 4-1 to 4-3 and Comparative Example

TABLE 4

| | | Cell characteristics | | | | |
|---|---|---|---|---|---|---|
| Example/ Comparative Example | Binder + LiOH 0.5 equiv. | Initial efficiency 0.1 C % | Discharge efficiency 0.1 C mAh/g | Discharge efficiency 0.2 C mAh/g | CRR 1.0 C 100 times % | Expansion rate SOC 100% % |
| Example 3-1 | PMDA/DABA (124 g/equiv.) | 81.9 | 650 | 649 | 80.5 | 50.5 |
| Example 3-2 | PMDA/ODA (210 g/equiv.) | 80.9 | 632 | 628 | 79.0 | 51.6 |
| Comparative Example 3-3 | 6FDA/ODA (322 g/equiv.) | 77.9 | 629 | 627 | 77.5 | 57.0 |
| Comparative Example 3-4 | BPADA/ODA (360 g/equiv.) | 77.6 | 662 | 660 | 75.1 | 61.3 |

Figure 5:
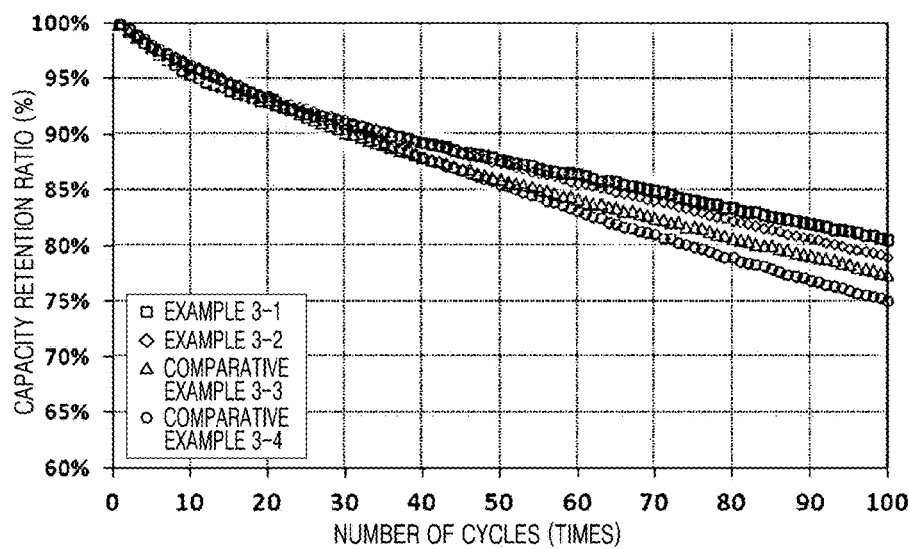
FIG. 5 is a graph showing CRR evaluation results of lithium batteries manufactured according to Examples 3-1 and 3-2 and Comparative Examples 3-3 and 3-4.

As shown in Table 4 above and FIG. 5, the lithium batteries of Examples 3-1 and 3-2 exhibited excellent initial efficiency and CRR and a greater effect of suppressing expansion of the respective anodes, as compared to the lithium batteries of Comparative Examples 3-3 and 3-4.

4-4 were evaluated as in Evaluation Example 2, and the results thereof are shown in Table 5 below.

In addition, cell characteristics of each lithium battery were evaluated as in Evaluation Example 4, and the results thereof are shown in Table 5 below and FIG. 6.

TABLE 5

| Example/Comparative Example | Curing temperature | Imidization ratio (%) | Cell characteristics | | | |
|---|---|---|---|---|---|---|
| | | | Initial efficiency 0.1 C % | Discharge capacity 0.1 C mAh/g | Discharge capacity 0.2 C mAh/g | CRR 1.0 C 100 times % |
| Example 4-1 | 110° C. | 55 | 82.4 | 646 | 642 | 78.5 |
| Example 4-2 | 130° C. | 76 | 80.8 | 663 | 651 | 79.9 |
| Example 4-3 | 150° C. | 85 | 80.3 | 657 | 645 | 79.6 |
| Comparative Example 4-4 | 350° C. | 97 | 79.4 | 635 | 634 | 78.1 |

Figure 6:
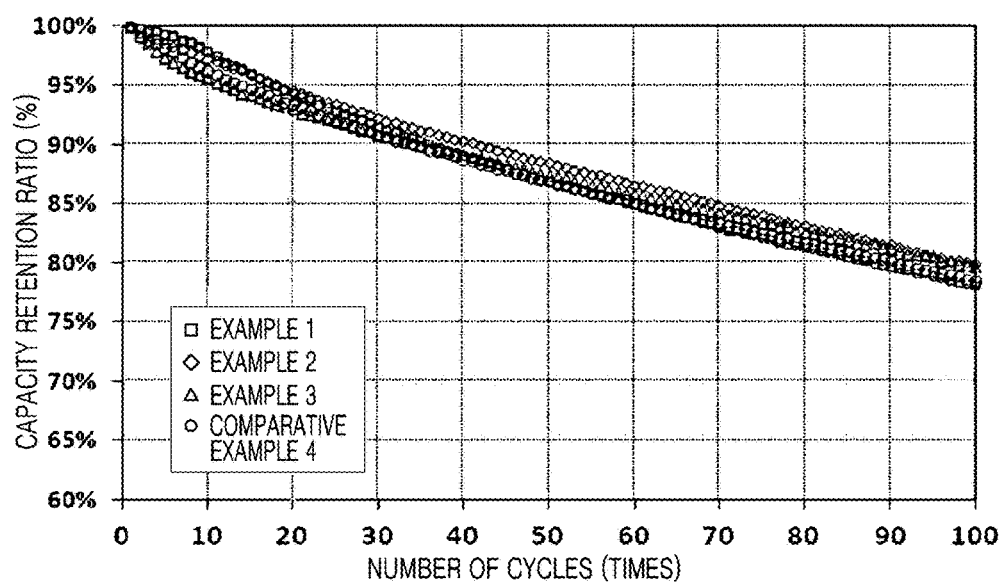
FIG. 6 is a graph showing CRR evaluation results of lithium batteries manufactured according to Examples 4-1 to 4-3 and Comparative Example 4-4.

As shown in Table 5 above and FIG. 6, the lithium batteries of Examples 4-1 to 4-3 exhibited a considerable degree of imidization ratio and higher initial efficiency and CRR, as compared to the lithium battery of Comparative Example 4-4.

As is apparent from the foregoing description, a water-soluble polyamic acid according to an embodiment is a polyamic acid lithiated by using LiOH. When such water-soluble polyamic acid is used, a curing temperature of an imidization reaction may be reduced, water solubility may increase, and a decrease in initial efficiency of a lithium battery may be prevented due to the prelithiation effect.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present disclosure as defined by the following claims.

What is claimed is:

1. A water-soluble partially lithiated polyamic acid having an acid equivalent of less than 300 grams per equivalent and a degree of lithium ion substitution of from about 0.2 equivalents to about 1.0 equivalent with respect to carboxylic acid groups, which is a product of a polyamic acid and lithium hydroxide.

2. The water-soluble partially lithiated polyamic acid of claim 1, wherein the acid equivalent of the polyamic acid is between about 50 grams per equivalent and about 250 grams per equivalent.

3. The water-soluble partially lithiated polyamic acid of claim 1, wherein the water-soluble polyamic acid has a pH of from about 4 to about 7.

4. The water-soluble partially lithiated polyamic acid of claim 1, wherein the water-soluble polyamic acid has an imidization ratio of from about 50% to about 90% at a curing temperature of 150° C. or less.

5. A binder composition for a lithium battery, comprising the water-soluble partially lithiated polyamic acid according to claim 1 and a solvent.

6. The binder composition of claim 5, wherein the solvent is water, a polar organic solvent, or a combination thereof.

7. The binder composition of claim 6, wherein the polar organic solvent is at least one solvent selected from N,N-dimethylformamide, N,N-dimethylacetamide, methyl ethyl ketone, cyclohexanone, ethyl acetate, butyl acetate, cellosolve acetate, propylene glycol monomethyl ether acetate, methyl cellosolve, butyl cellosolve, methyl carbitol, butyl carbitol, propylene glycol monomethyl ether, diethylene glycol dimethyl ether, toluene, and xylene.

8. The binder composition of claim 5, wherein the solvent comprises water and a polar organic solvent, and the water and the polar organic solvent are combined in a volume ratio of from about 10:1 to about 1:10.

9. A method of preparing a water-soluble polyamic acid, the method comprising:
adding, to a polyamic acid having an acid equivalent of less than 300 grams per equivalent, lithium hydroxide in an amount of from about 0.2 equivalents to about 1.0 equivalent with respect to carboxylic acid group to lithiate the polyamic acid.

10. A method of manufacturing an electrode for a lithium battery, the method comprising:
providing an electrode slurry comprising an electrode active material and the binder composition according to claim 5; and
heat-treating the electrode slurry at a temperature of 150° C. or less to form the electrode for a lithium battery.

11. The method of claim 10, wherein the electrode active material comprises at least one anode active material selected from a silicon active material, a tin active material, a silicon-tin alloy active material, and a silicon-carbon active material.

* * * * *

UNITED STATES PATENT AND TRADEMARK OFFICE
CERTIFICATE OF CORRECTION

PATENT NO. : 10,186,709 B2
APPLICATION NO. : 15/356932
DATED : January 22, 2019
INVENTOR(S) : Woojin Bae et al.

Page 1 of 1

It is certified that error appears in the above-identified patent and that said Letters Patent is hereby corrected as shown below:

On the Title Page

Item (73) Assignee: "SAMSUNG ELECTRONICS CO., LTD., SUWON-SI, GYEONGGI-DO (KR)"
Should read:
--SAMSUNG ELECTRONICS CO., LTD., SUWON-SI, GYEONGGI-DO (KR)
SAMSUNG SDI CO., LTD., YONGIN-SI, GYEONGGI-DO (KR)--

Signed and Sealed this
Seventh Day of April, 2020

Andrei Iancu
*Director of the United States Patent and Trademark Office*